Dec. 11, 1945. V. W. SHERMAN 2,390,559
APPARATUS FOR SELECTIVE HEAT TREATMENT OF METAL
Filed Feb. 25, 1943 2 Sheets-Sheet 1
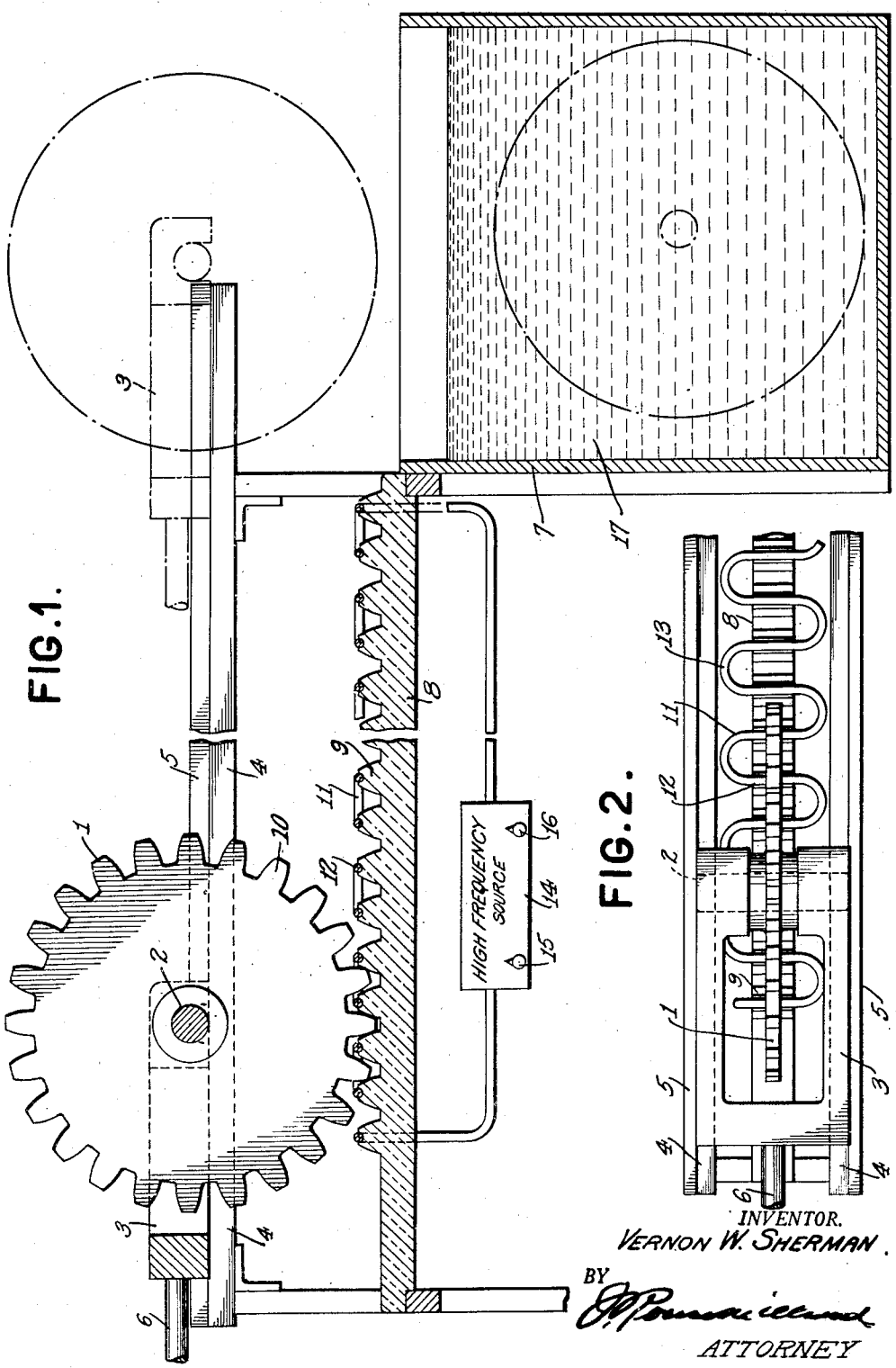
INVENTOR.
VERNON W. SHERMAN
BY
ATTORNEY Dec. 11, 1945.  V. W. SHERMAN  2,390,559
APPARATUS FOR SELECTIVE HEAT TREATMENT OF METAL
Filed Feb. 25, 1943  2 Sheets-Sheet 2
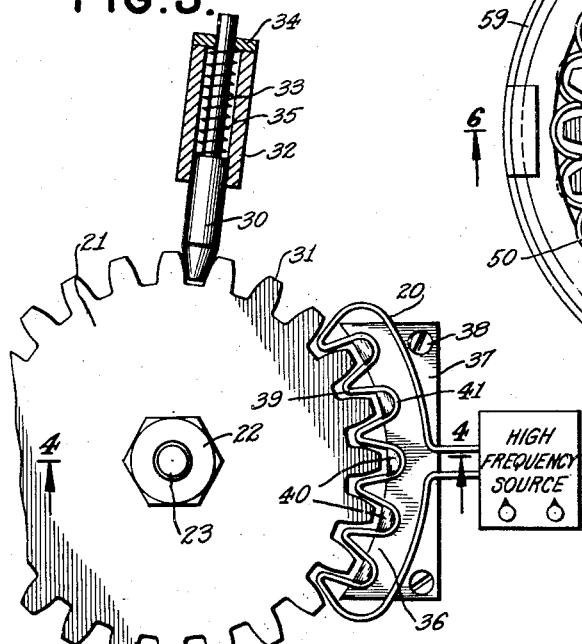
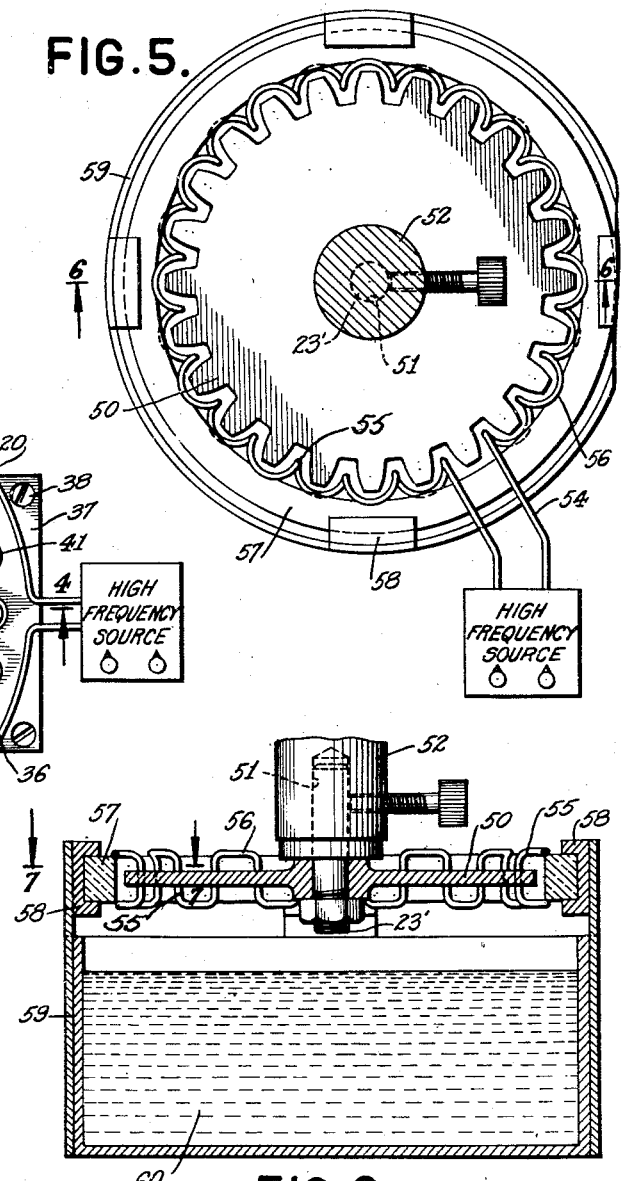
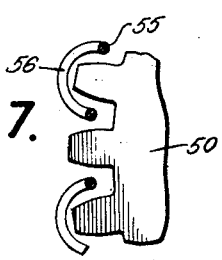
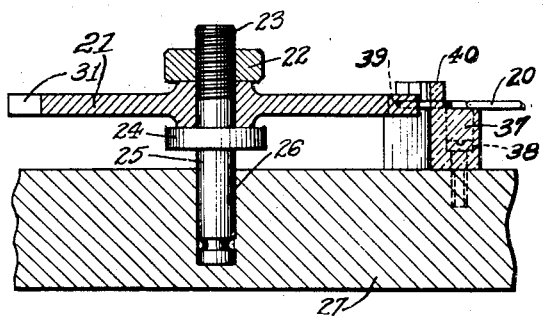
INVENTOR.
VERNON W. SHERMAN
BY
ATTORNEY Patented Dec. 11, 1945

2,390,559

UNITED STATES PATENT OFFICE 2,390,559

APPARATUS FOR SELECTIVE HEAT TREATMENT OF METAL

Vernon W. Sherman, Summit, N. J., assignor to Federal Telephone & Radio Corporation, New York, N. Y., a corporation of Delaware Application February 25, 1943, Serial No. 477,084

14 Claims. (Cl. 219—13)

This invention relates to apparatus for the heat treatment of metal, particularly selected portions of the surface of ferrous metal gear wheels or the like.

Heretofore gear wheels have been heated as an incident to the hardening of the gear teeth by placing the gear within a solenoid consisting of a conducting helix carrying an alternating current for magnetically inducing a heating current in the gear. After heating the gear to a suitable temperature by this method of heating, it is then subjected to a quenching operation. In this method of heating the gear, use is made of currents which, although said to be of "radio" or "high frequency," are usually of considerably less than 1,000,000 cycles per second, it being necessary that the heating current be of relatively low frequency in order that the induced currents in the gear wheel may penetrate radially into the wheel far enough to reach the working faces of the teeth. As a consequence of this method of heating, the hardening process extends so far radially into the gear wheel that objectionable brittleness and lack of toughness results at the base of the teeth with consequent danger of fracture of the teeth under sudden load conditions. Moreover, the path of the heating current in the gear is such that excessive heating occurs at the outer portions of the teeth, as a consequence of which the tips of the teeth may be melted or deformed before quenching, or may be so hard after quenching as to be brittle and undesirably susceptible to chipping and injury when subjected to sudden shock or accidental impact.

Some of the objects of the present invention are to provide a simple and effective apparatus for efficiently heat treating a wheel of ferrous or other metal, such as a gear wheel having one or more reentrant portions in the periphery thereof, so that the desired part of the reentrant portion is suitably heated without hardening or otherwise heat treating the metal adjacent thereto which is relied upon as a support for or connection with the desired heat treated part; and generally to improve apparatus for the selective heat treatment of metal.

According to one feature of the present invention, a wheel having a reentrant portion in the periphery thereof, such as the reentrant portion between two adjacent teeth of a gear wheel, is heated by induction from a high frequency current conductor closely coupled magnetically with the surface layer of the reentrant portion or portions of the wheel, while being loosely coupled magnetically with the metal below this surface layer and with the metal in other parts of the wheel, thereby permitting of selective heat treatment of desired parts of the wheel without objectionably heating other parts of the wheel. The wheel is then subjected to a quenching operation.

According to another feature of the invention, apparatus for heat treating a gear wheel includes a heating conductor of the magnetic inductor type in such relation to a support for the gear wheel that the above described coupling relations are efficiently established, so that the desired selective heating and hardening of the surface layer of the work may be readily obtained. In one form, the invention achieves these results by apparatus which heats the teeth of the gear successively; in a second form, different sectors of the wheel are heated separately; while in a third form, all the teeth are heated at the same time.

These and other objects and features of the invention will be understood from the following detailed description in connection with the accompanying drawings of apparatus illustrative of the invention.

In the drawings:

Fig. 1 is an elevation showing schematically, apparatus for selectively hardening the working surfaces of the teeth of a ferrous metal wheel;

Fig. 2 is a plan of the Fig. 1 apparatus;

Figs. 3 and 4 are, respectively, a plan and elevation of apparatus for heat treating the working surfaces of teeth in one sector of a gear wheel at a time;

Figs. 5 and 6 are, respectively, a plan and an elevation of a further modification for heat treating the working surfaces of all the teeth of a gear at once;

Fig. 7 is a partial detail sectional view on line 7—7 of Fig. 6.

In Figs. 1 and 2, the gear wheel 1, of hardenable ferrous or other suitable metal, is mounted on the shaft 2, piloted by bearings in the frame 3 and supported together with frame 3 on the two rails 4 having the side flanges 5 which prevent axial displacement of shaft 2 and guide frame 3 along rails 4. The rod 6, connected with frame 3, is actuated by any suitable means, not shown, to move frame 3 with shaft 2 and gear 1 at a uniform speed along rails 4 from the left end thereof to the right end thereof while the gear wheel is being subjected to heat treatment, as will be explained hereinafter. When the frame 3 passes the right end of rails 4, shaft 2 is pushed off the rails 4 and drops by gravity out of its bearings in frame 3, so that the shaft 2 and gear 1 fall into the quenching bath tank 7 which may contain water or other suitable quenching liquid 17.

Supported below the rails 4, in line with the path of travel of the lower edge of gear 1, is supported the rack 8 of heat resisting electrical insulating material, such as porcelain or other suitable ceramic material for example, the teeth 9 of the rack being positioned to mesh with the teeth 10 of gear 1, so that the gear rotates one complete revolution in making a complete movement from one end of the rack to the other. In Figs. 1 and 2, the length of each figure has been shortened horizontally by making a break therein, the omitted structure being of the same form as that shown.

The top of each tooth 9 in the rack is truncated and shaped to receive and support the heating conductor 11 of copper or other good conductor of electricity, having a serpentine shape with straight runs 12 extending parallel to and preferably centralized over the working faces of gear teeth 10 and positioned midway between and in close magnetic coupling with the working faces of adjacent teeth 10 of the gear when these teeth are equally in mesh with rack 8 at opposite sides of a given run 12 of the heating conductor. The minimum spacing between conductor 11 and teeth 10 is made as small as practicable without causing the conductor to touch or produce arcing of the heating current while the gear is fed along the rack. This spacing may be as small as one-sixty-fourth of an inch for example, but may be considerably larger. The loops 13 which connect adjacent runs 12 of the heating conductor, are preferably spaced far enough from other portions of the teeth 10 of the gear to make the magnetic coupling therewith as loose as possible. It will thus be seen that the straight runs 12 constitute active sections of conductor 11, and that the loops 13 constitute passive sections of the conductor as regards its coupling with the wheel.

The source of high frequency current 14, preferably including electronic oscillators, not shown, is connected with heating conductor 11, and ordinarily has a frequency of 1,000,000 cycles per second or more, being preferably of the order of 5,000,000 cycles per second or more, for example. The frequency and amplitude of the current in conductor 11 is readily controlled, respectively, in any well known manner, not shown, by knobs 15 and 16. While the heating current is being passed through the conductor 11, the conductor itself need not be substantially heated and may be cooled by well known means, not shown, if the temperature tends to rise objectionably.

The gear wheel 1 is fed from an extreme left position to the extreme right by the rod 6, so that a different run 12 of conductor 11 is successively placed in close coupling relation, as described above, with a pair of working or wearing faces in each reentrant portion of the wheel between adjacent teeth 10. The temperature of a surface layer of the teeth is thus raised to the desired high temperature by conductor 11 acting as a primary inductor to induce large secondary currents in a thin layer of the metal under the working surface of the teeth. This layer in conjunction with the position of the primary inductor 11 serves to shield the metal below this layer, thus preventing the penetration of an undesired strength of current below this layer, the other parts of the wheel being so loosely coupled with the conductor 11 as to be inappreciably heated thereby.

By adjusting the magnitude of current and the time of travel of the wheel along the rack, the thickness of the heated layer may be controlled as desired. When the gear 1 reaches the last rack tooth 9 at the right of Figs. 1 and 2, the last pair of working faces of the gear teeth 10, theretofore unheated, are raised to the desired temperature, and the wheel 1 continues on its path into the quenching bath 7 where the heated working faces of the teeth are hardened. The body and base of each tooth and other parts of the wheel remain in substantially their original tough and unhardened condition, so that the wheel is more rugged and of greater strength than the prior wheels referred to above, and is adapted for more reliable operation and longer useful life than such prior wheels.

In Figs. 3 and 4, the arrangement illustrated is particularly well adapted for hardening the working faces of relatively heavy gear wheel or wheels of relatively large diameter. In such cases, a heating conductor of the form shown in Fig. 1, capable of extending far enough to reach around the complete periphery of the gear wheel may have too high an impedance for practical operation at the frequency of the heating current or the gear may be so bulky that the Fig. 1 arrangement is not desirable. In the Fig. 3 modification, the heating conductor 20 is made of relatively short length so that it may provide a path of adequately low impedance for the desired heating current. The gear wheel 21 is securely clamped by the nut 22 threaded on the upper end of arbor 23 extending through the center of wheel 21. A shoulder 24, against which the wheel 21 and nut 22 are clamped, is provided below the wheel. The lower end 25 of arbor 23 is journaled in the bearing 26 in the base block 27.

For the purpose of indexing the wheel 21 and holding it in working relation with the heating conductor 20, the movable indexing tooth 30, fitting closely between the working faces of two adjacent teeth 31, is mounted for axial movement within the fixed tubular guide 32, and has an axial stem 33 extending rearwardly therefrom through the closed end 34 of tube 32, the outer end of the stem 33 serving as a handle to permit of withdrawal of tooth 30 from between the gear wheel teeth 31, so that the wheel 21 may be rotated clear of the tooth 30. A spiral spring 35, compressed between the end 34 of tube 32 and the tooth 30, urges the tooth firmly into contact with the adjacent faces of teeth 31, thus locking the wheel 21 against angular displacement.

The heating conductor 20 is mounted on the flat upper surface 36 of the block 37 of heat resisting electrical insulating material fastened to the bearing block 27 by screws 38 or other suitable means. Conductor 20 is bent into a corrugated shape wherein the conductor has a plurality of generally V-shaped elements 39, extending in an arc coaxial with a gear wheel 21. The spacings between the vertices of the V-shaped elements 39 correspond with those between the teeth in wheel 21, so that conductor 20 may be positioned with the V-shaped elements projecting into the spaces between successive pairs of teeth around the periphery of the wheel within a given sector thereof. Adjacent the wheel 21, the block 37 is provided with a plurality of posts 40, extending axially of the gear wheel 21 and serving to guide conductor 20 when the conductor is moved radially into mesh with wheel 21, these posts 40 acting as stops to fix the desired position of the V-shaped elements 39 of conductor 20 within the gaps between adjacent teeth of wheel 21. Each V- shaped element 39 is preferably so positioned when in operative meshed relation with wheel 21, that the conductor is closely coupled with the adjacent working faces of the teeth between which it is positioned, the vertex of the V being preferably spaced far enough radially outward from the bottom of the space between adjacent teeth to reduce the magnetic coupling as nearly as possible to a loose coupling with the metal connecting adjacent teeth to reduce the heating in that region. The loop portions 41 of conductor 20, bent around posts 40 and connecting adjacent V's 39, are preferably spaced far enough away from the radially outer ends of the adjacent teeth of wheel 21, to provide a loose magnetic coupling therewith to prevent excessive or objectionable heating at the outer end of the teeth. It will be seen the two sides of each V element 39 may be looked upon as being active sections of conductor 20, since they are closely coupled with the working surfaces of adjacent gear teeth and consequently may efficiently induce heating currents within a thin layer co-extensive with the working surfaces of the teeth, while the vertices of the V's and the outer bends 41 connecting the V's may be regarded as passive sections of conductor 20, since their loose coupling with the metal of the gear wheel 21 prevents them from producing excessive or objectionable heat within the gear.

In heat treating the gear in Figs. 3 and 4, a large heating current is passed for a very short predetermined interval through conductor 20 the frequency and strength of current being sufficient to raise the temperature of a layer of the metal at the working surfaces of the gear teeth to a suitable temperature for case hardening purposes, the interval of time during which the heating currents are induced in the gear wheel being too short to allow of substantial flow of heat from the heated layer to the metal thereunder. The mass of unheated metal under the heated layer at each working surface, is such that after cessation on the heating current, the temperature of the heated surface layer is almost instantly quenched by the rapid flow of heat to the underlying metal, thus resulting in quenching and hardening of the working surfaces of the teeth. It will be obvious that the apparatus of Figs. 3 and 4 is adapted not only for the self-quenching of a sector of the wheel 21 but is also adapted for quenching by immersion according to any of the well known methods. It will be seen that the conductor 20 may have any desired dimension axially of the gear teeth without increasing the thickness dimension radially of the teeth.

After the hardening of the working surfaces within the sector spanned by conductor 20, tooth 30 is removed from engagement with wheel 21, conductor 20 being momentarily removed from meshing relation with wheel 21, and the wheel being indexed to a position wherein the next sector adjacent to that subjected to the heat treatment is indexed opposite the block 37, so that conductor 20 may then be restored to meshing relation with wheel 21, while the wheel is locked by tooth 30 and the teeth within the newly indexed sector of wheel 21 may then be subjected to the case hardening treatment already described. In this manner the successive sectors of the wheel may be hardened until all the teeth have been suitably treated.

In the modification of Figs. 5 and 6, the gear wheel 50 is mounted on an arbor 23', similar to that in Figs. 3 and 4, the arbor being fastened within the hole 51 at the lower end of the axially adjustable plunger 52, which is quickly propellable axially to any desired position by hydraulic means, or any other well known means, not shown.

The serpentine heating conductor 54, extending as a ring around the periphery of wheel 50, has the substantially vertical or straight runs or active sections 55, parallel with the working faces of the teeth in wheel 50. Sections 55 are closely coupled with the working faces of the teeth and are connected together by the U-shaped loops 56, constituting passive sections, whose couplings with the metal of wheel 50 are made as loose as practicable without introducing excessive impedance in the conductor 50.

In order to provide clearance for movement of gear wheel 50 axially through the ring formed by conductor 54, the loops 56 of conductor 54 are bent radially outward. The radially outer ends of loops 56 frictionally engage the upper and lower inner edges of the ring 57 of heat resisting, electrically insulating material, such as that employed for the rack 8 in Figs. 1 and 2, the ring 57 serving as a support for holding conductor 54 in a fixed position, so that gear wheel 50 may be moved axially into registration with the conductor 54, as shown in Fig. 6, for the application of heat simultaneously to all teeth of the wheel. Each active run 55 of the heating conductor is positioned in the same relation to the working faces of a pair of adjacent teeth of the wheel 50, as the most closely meshed active run 12 in Figs. 1 and 2, is positioned relatively to gear wheel 1. Ring 57 is held firmly within the fixed C-shaped supports 58, 58, above the quenching tank 59 containing the water or other suitable cooling liquid 60 for quenching the wheel after the heating.

In operating the apparatus of Figs. 5 and 6, the wheel 50 is mounted on the arbor 23, the arbor being then mounted in plunger 52 while the plunger is lifted axially above the position shown in Fig. 6. The heating current from the high frequency source 14 is adjusted to a suitable frequency and amplitude as described above, the current being passed through conductor 50 for a predetermined brief interval, usually of the order of a fraction of a second, such as ⅓ of a second or more, for example. During this interval the working surfaces of the teeth are quickly brought up to the desired temperature for quenching, the wheel then being quickly lowered by plunger 52 into the liquid 60 for quenching and hardening the working surfaces of the gear teeth.

The different modifications described above are adapted not only for hardening the surface of metal wheels but may be employed for annealing and other heat treatment of metal work. For the purpose of annealing selected portions of the work, the heat may be applied by the method described above, the work being allowed to cool at the desired rate for annealing by continuing the heating current at a gradually reduced rate until the desired cooling has taken place without any sudden quenching operation.

It will be obvious from the above description that the specific modifications referred to by way of example, may be varied considerably in form and details without departing from the invention as defined in the appended claims.

What is claimed is:

1. Apparatus for heat treating a ferrous metal gear wheel, including a rack of heat resisting electrical insulating material for meshing with the gear wheel, a high frequency electric current conductor of serpentine form having active sections thereof supported in fixed relation to the teeth of said rack, said active sections being in positions wherein they are successively disposed within the corresponding spaces between successive adjacent pairs of teeth in the wheel when the wheel is rolled along the rack in mesh with the teeth therein.

2. Apparatus according to claim 1, wherein said conductor has passive sections connecting between said active sections, said active sections being successively closely coupled with the working faces of the successive adjacent pairs of teeth in the wheel with which they mesh when the wheel is rolled along the rack in mesh with the teeth therein, said passive sections being loosely coupled with the gear wheel throughout its path along the rack.

3. Means for heat treating a metal wheel having toothed portions in the periphery thereof, said means including a movable support for the wheel, a high frequency electric current conductor having active sections positioned to act upon opposite faces of each tooth forming part of said portions in spaced relation to the wheel, a support for the conductor of heat resisting electrical insulating material and formed for indexing engaging with the wheel and said supports being arranged for relative movement to permit heat treating of all of said engaging surface portions in a continuous operation.

4. In a device for progressively heat treating a toothed work piece, means to support the work piece for rotation, a toothed body of heat resisting electrical insulating material capable of engaging a portion of said work piece during rotation to index its position, a high frequency inductor on said body arranged to act simultaneously upon opposing faces of each tooth of said portion while piece and body are in progressing engagement.

5. A device according to claim 4, comprising high frequency conductor means arranged at the top of the teeth of said body to act upon the bottom of said teeth while work piece and body are in engagement.

6. A device according to claim 4, comprising high frequency conductor means arranged to act at a distance from the bottom surface of the teeth of said body while body and wheel are in engagement.

7. A device according to claim 4, wherein said work piece consists of a toothed metal wheel, and said body consists of a toothed rack capable of engaging said wheel while said wheel is moved over said rack thereby turning and indexing the position of said wheel.

8. A device according to claim 4, comprising high frequency conductor means having a linear conductor winding over successive teeth of said body while avoiding the spaces between said teeth to permit the teeth of said work piece to enter said spaces.

9. A device according to claim 4, comprising high frequency conductor means having an active section positioned to have a close magnetic coupling with one side of the engaging portion of said work piece at the working frequency.

10. A device according to claim 4, comprising high frequency conductor means having an active section positioned to have a close magnetic coupling with each side of the engaging portion of said work piece and a loose magnetic coupling with the other portions of said work piece at the working frequency.

11. A device according to claim 4, comprising high frequency conductor means having an active section positioned to have a close magnetic coupling with each side of the engaging portion of said work piece and a loose magnetic coupling with the other portions of said work piece at the working frequency, said conductor means also comprising a separate passive section contiguous with each end of said active section, said passive sections positioned to have a loose magnetic coupling with the engaging portion of said piece and the other portions thereof at the working frequency.

12. A device according to claim 4, comprising high frequency conductor means including a high frequency electric current conductor of serpentine form having a number of active sections having spaces between them corresponding to those between the teeth of said work piece, a support for said work piece, and means for supporting said conductor with one of the active sections thereof positioned in the space between two adjacent teeth of said work piece while said work piece is moved by its support.

13. A device according to claim 4, comprising high frequency conductor means having a serpentine form which consists of a number of active sections having spaces between them corresponding to those between the teeth of said work piece, a support for said work piece, and means for supporting said conductor with each of a number of the active sections thereof in a different engaging tooth-gap in said work piece and with a spacing between the conductor and the tooth at each side thereof, while said work piece is mounted on its support.

14. A device according to claim 4, comprising high frequency conductor means including a single high frequency electric current conductor of serpentine form having a number of active sections having spaces between them corresponding to those between the teeth of said work piece, a support for said work piece, and means for supporting said conductor with one of the active sections thereof positioned in the space between two adjacent teeth of said work piece while said work piece is moved by its support, and wherein a source of oscillating current having a frequency of at least one million cycles per second is connected with said conductor.

VERNON W. SHERMAN.